(12) United States Patent
Mannhart et al.

(10) Patent No.: US 11,569,918 B2
(45) Date of Patent: Jan. 31, 2023

(54) NONRECIPROCAL QUANTUM DEVICE USING QUANTUM WAVE COLLAPSE, INTERFERENCE AND SELECTIVE ABSORPTION

(71) Applicant: Max-Planck-Gesellschaft Zur Förderung Der Wissenschaften E.V., Munich (DE)

(72) Inventors: Jochen Mannhart, Böblingen (DE); Daniel Braak, Augsburg (DE)

(73) Assignee: Max-Planck-Gesellschaft Zur Förderung Der Wissenschaften E.V., Munich (DE)

( * ) Notice: Subject to any disclaimer, the term of this patent is extended or adjusted under 35 U.S.C. 154(b) by 0 days.

(21) Appl. No.: 17/275,865

(22) PCT Filed: Sep. 12, 2019

(86) PCT No.: PCT/EP2019/074347
§ 371 (c)(1),
(2) Date: Mar. 12, 2021

(87) PCT Pub. No.: WO2020/053333
PCT Pub. Date: Mar. 19, 2020

(65) Prior Publication Data
US 2022/0045769 A1 Feb. 10, 2022

(30) Foreign Application Priority Data
Sep. 14, 2018 (EP) ...................................... 8194460

(51) Int. Cl.
*H04B 10/70* (2013.01)

(52) U.S. Cl.
CPC .................................... *H04B 10/70* (2013.01)

(58) Field of Classification Search
CPC ........................................................ H04B 10/70
USPC ........................................................... 398/115
See application file for complete search history.

(56) References Cited

U.S. PATENT DOCUMENTS

| 10,230,038 B2 * | 3/2019 | Abdo .................. H01L 39/2493 |
| 10,374,656 B2 * | 8/2019 | Cox ....................... H04L 5/1461 |
| 2004/0156407 A1 * | 8/2004 | Beausoleil ............. B82Y 10/00 372/17 |
| 2007/0250280 A1 | 10/2007 | Beausoleil et al. |

(Continued)

FOREIGN PATENT DOCUMENTS

| EP | 3151292 A1 | 4/2017 |
| EP | 3534420 A1 | 4/2019 |
| EP | 3588671 A1 | 1/2020 |

(Continued)

OTHER PUBLICATIONS

Urbas et al; Roadmap on optical metamaterials; Aug. 2016; IOP publishing Journal of Optics; pp. 1-53. (Year: 2016).*

(Continued)

*Primary Examiner* — Amritbir K Sandhu
(74) *Attorney, Agent, or Firm* — TraskBritt

(57) ABSTRACT

A quantum device comprising a transmission structure, wherein based on quantum collapse, interference and selective absorption the transmission structure is designed such that quantum waves emitted by at least two bodies, for example, by thermal excitation, are passed preferentially to a subset of these bodies.

26 Claims, 6 Drawing Sheets

(56) References Cited

U.S. PATENT DOCUMENTS

| | | | | |
|---|---|---|---|---|
| 2021/0273733 A1* | 9/2021 | Mannhart | ............... | G01B 9/02 |
| 2022/0045769 A1* | 2/2022 | Mannhart | ............ | H04B 10/70 |

FOREIGN PATENT DOCUMENTS

| | | | | |
|---|---|---|---|---|
| EP | 3770970 A1 * | 1/2021 | ............ | B82Y 10/00 |
| WO | WO-2013152304 A2 * | 10/2013 | ............ | H01L 27/18 |
| WO | 2016157184 A1 | 10/2016 | | |

OTHER PUBLICATIONS

Sollner et al; Deterministic photon-emitter coupling in chiral photonic circuits; Jul. 2015; Nature nanotechnology; pp. 1-5. (Year: 2015).*

Hafezi et al; Optomechanically induced non-reciprocity in microring resonators; Mar. 2012; Optical Society of America; pp. 1-13. (Year: 2012).*

Carlos et al; Nonreciprocal few-photon routing schemes based on chiral waveguide-emitter couplings; 2016, Physical review letters; pp. 1-14. (Year: 2016).*

Carlos et al; Nonreciprocal few-photon routing schemes based on chiral waveguide-emitter couplings; 2016; American Physical society, pp. 1-14. (Year: 2016).*

Sollner et al; Nonreciprocal few-photon routing schemes based on chiral waveguide-emitter couplings; Jul. 2015, Nature.com; pp. 1-5. (Year: 2015).*

Urbas et al; Nonreciprocal few-photon routing schemes based on chiral waveguide-emitter couplings; 2016; IOP Publishing ; pp. 1-54. (Year: 2016).*

Seif et al; Thermal management and non-reciprocal control of phonon flow via opto mechanics; 2018; Nature Communications; pp. 1-8. (Year: 2018).*

International Search Report for International Application No. PCT/EP2019/074347, dated Oct. 10, 2019, 6 pages.

International Written Opinion for International Application No. PCT/EP2019/074347, dated Oct. 14, 2019, 6 pages.

Söllner et al, "Deterministic photon-emitter coupling in chiral photonic circuits", Nature Nanotechnology, vol. 10, No. 9, Sep. 1, 2015 (Sep. 1, 2015), p. 775-778, XP055532837 DOI: 10.1038/nnano.2015.159.

Gonzalez-Ballestero et al, "Nonreciprocal few-photon routing schemes based on chiral waveguide-emitter couplings", Physical Review A, vol. 94, No. 6, Dec. 1, 2016 (Dec. 1, 2016), XP055573979 DOI: 10.1103/PhysRevA.94.063817.

Muruyama et al "The physics of Maxwell's demon and information" Rev. Submitted on Jul. 23, 2007 (v1), last revised Aug. 5, 2008 or arXiv:0707.3400v2 [physics.hist-ph] (24 pages).

Mannhart "Non-reciprocal Interferometers for Matter Waves" Journal of Superconductivity and Novel Magnetism (2018) 31:1649-1657 https://doi.org/10.1007/s10948-018-4637-4.

European Extended Search Report and Opinion for European Application No. 18194460.4, dated Jun. 28, 2019, 15 pages.

* cited by examiner

NONRECIPROCAL QUANTUM DEVICE USING QUANTUM WAVE COLLAPSE, INTERFERENCE AND SELECTIVE ABSORPTION

CROSS-REFERENCE TO RELATED APPLICATIONS

This application is a national phase entry under 35 U.S.C. § 371 of International Patent Application PCT/EP2019/074347, filed Sep. 12, 2019, designating the United States of America and published as International Patent Publication WO 2020/053333 A1 on Mar. 19, 2020, which claims the benefit under Article 8 of the Patent Cooperation Treaty to European Patent Application Serial No. 18194460.4, filed Sep. 14, 2018, the entire disclosures of which are hereby incorporated herein by reference.

TECHNICAL FIELD

The present disclosure relates to a nonreciprocal quantum device comprising a transmission structure that utilizes the collapse of quantum waves, their interference and their selective absorption to shift two or more bodies into a new equilibrium state. The present disclosure also relates to a method for operating such a quantum device and to a use of one or more of such quantum devices in a lot of different devices.

BACKGROUND

In the following description reference will be made to the following documents:
1. J. Mannhart, J. Supercond. Novel. Magn. 31, 1649 (2018).
2. D. Braak and J. Mannhart, European Patent Application No. 18 180 759.5 "A Non-reciprocal Device Comprising Asymmetric Phase Transport of Waves" (not yet published at the priority date of the present application).
3. J. Mannhart, European Patent Application No. 18 159 767.5 "Non-reciprocal Filters for Matter Waves" (not yet published at the priority date of the present application).
4. M. Planck, Verhandlungen der Deutschen Physikalischen Gesellschaft 2, 245 (1900).
5. J. C. Maxwell, *Theory of Heat*, Longmans, Green, and Co. (1871).
6. V. Capek and D. P. Sheehan, "Challenges to the Second Law of Thermodynamics," Springer 2005.
7. C. Cohen-Tannoudji, J. Dupont-Roc, G. Grynberg, *Atom-Photon Interactions, Basic Processes and Application*, Wiley-VCH (2004).
8. R. Loudon, *The Quantum Theory of Light*, Oxford Science Publications, Third Edition (2000).
9. Y. Imry, "Introduction to Mesoscopic Physics," Oxford University Press (2002).
10. Th. M. Nieuwenhuizen, A. E. Allahverdyan, Phys. Rev. E, 036102 (2002).
11. L. E. Reichl, "A Modern Course in Statistical Physics," E. Arnold, 1980.
12. Z. Merali, Nature 551, 20, (2017).
13. K. Maruyama, F. Nori, V. Vedral, Rev. Mod. Phys. 81, 1 (2009).
14. J. Johnson, Phys. Rev. 32, 97 (1928).
15. H. Nyquist, Phys. Rev. 32, 110 (1928).
16. E. Fermi, "*Thermodynamics*," Dover Publications, 1956.

In Ref. 2 nonreciprocal quantum devices have been disclosed that break the second law of thermodynamics by altering quantum waves using coherence filters. The present disclosure shows a way, in which an equivalent breaking of the zeroth and the second law of thermodynamics, and also of the third law of thermodynamics, is provided by even simpler devices that do not rely on the use of coherence filters, but utilize solely the collapse of quantum waves, their interference and their selective absorption. Despite the abolished need of coherence filters, the devices disclosed here resemble in numerous features and in many parts of their function the devices disclosed in Ref. 2.

BRIEF SUMMARY

In accordance with a first aspect of the present disclosure a quantum device comprises a transmission structure connected between at least a first and a second port, wherein the transmission structure is designed such that it implements collapse, interference and selective absorption of quantum waves to achieve a nonreciprocal motion of quantum waves between the ports.

According to an embodiment of the quantum device, the quantum device comprises or consists of a photonic device and the quanta are photons. Some of the embodiments of a quantum device described in the following are related to a quantum device as a photonic device, which means that the elements of the device are comprised of optical elements. However, it should be appreciated that the quantum device could also be realized with other type of quanta like, for example, electrons as will be shown in further detail below.

The first port and the second port may emit first quantum waves, and the transmission structure may include a wave splitter for the first quantum waves. Furthermore the device may comprise a system for absorbing and reemitting part of the first quantum waves as second quantum waves. The device may further comprise a system that via interaction with the wave splitter creates interference between the second quantum waves such that the interfering second quantum waves are sent with preference to one port.

According to an embodiment of the quantum device, the above mentioned system may be formed by at least one one-dimensional transmission structure or an at least one-dimensional transmission structure. The transmission structure contains in the center thereof an entity, which can be a single atom, a number of single atoms or molecules, or a multitude of atoms, molecules or particles with a characteristic behavior characterized by the behavior of single atoms, without or with the presence of superradiance. This entity can advantageously be mounted to a larger mass m such that during the absorption or emission of quantum waves the velocity change of the structure is negligible due to the conservation of momentum and the large value of m. The entity may be formed by a solid body, which contains one or more defects, for example, color centers that can absorb and emit waves in a manner as atoms do. The entity can be anything that is able to absorb and emit waves in a manner as atoms do. Therefore in the following the term "atom" will also be used instead of or as a synonym of the term "system."

According to an embodiment of the quantum device, the above mentioned wave splitter may be formed by a half-transparent mirror comprising a transparent plate, fabricated, for example, from glass that on one surface is covered with a coating such as a thin dielectric film. The properties of the coating are chosen such that the mirror reflects half of the incoming radiation and let the other half pass and that the mirror induces phase changes as detailed in FIG. 2 and the accompanying description below.

According to an embodiment of the quantum device according to the first aspect, it is comprised of a photonic device and the quanta are photons. The quantum device furthermore comprises first and second black body radiators, each one of them being disposed at one of the first and second ports so that radiation emitted from the first and second black body radiators impinge on opposing sides of the half-transparent mirror and are then partly reflected and transmitted by the half-transparent mirror. The quantum device furthermore comprises first and second (highly or normally reflecting) mirrors, which are disposed in such a way that transmitted and reflected waves coming from the half-transparent mirror impinge on the first and second mirrors and are reflected by the first and second mirrors in such a way that the reflected beams interfere with each other within or close to the system ("atom").

According to an embodiment of the quantum device according to the first aspect, the quantum device comprises or consists of an electronic device, the quanta are electrons. The wave splitter may be comprised of an asymmetric tunnel junction, and the atom or system may be comprised of a three-terminal junction. At the first and second ports first and second series connections of a resistor and a capacitor could be provided, such series connections being configured to supply the first quantum waves. Further details of such an embodiment are shown and described below.

In accordance with a second aspect of the present disclosure a method for operating a quantum device according to the first aspect comprises supplying the first quantum waves to the quantum device, wherein the first quantum waves comprise quanta with energies obtained from a thermal source or with energies E of order kT, such that 0<E<100 kT, wherein T is the temperature of the environment.

According to an embodiment of the method according to the second aspect, the quantum device comprises or consists of a photonic device, the quanta are photons, and supplying the first quantum waves comprises providing first and second black body radiators at the first and second ports, respectively.

According to an embodiment of the method according to the second aspect, the quantum device comprises or consists of an electronic device, the quanta are electrons, and supplying the first quantum waves comprises providing first and second series connections of a resistor and a capacitor at the first and second ports, respectively.

In accordance with a third aspect of the present disclosure, one or more quantum devices according to the first aspect are implemented or used in one or more of a device in which the first waves comprise quanta with energies obtained from a thermal source or with energies E of order kT, such that 0<E<100 kT, wherein T is the temperature of the environment;

a device utilizing coherent emission and at least partial collapses of wave functions to achieve a deviation from one or more of the zeroth law, the second, or the third law of thermodynamics;

a device utilizing quantum-mechanical superposition of states and at least partial collapses of wave functions to achieve a deviation from one or more of the zeroth, the second, or the third law of thermodynamics;

a device utilizing coherent emission and at least partial quantum-physical collapses of wave functions or quantum-mechanical superposition of states and at least partial collapses of wave functions to generate or to enhance inhomogeneities in the density of the energy distribution of waves or particles in a system;

a device utilizing coherent emission and at least partial quantum-physical collapses of wave functions or quantum-mechanical superposition of states and at least partial collapses of wave functions to shift a system out of the state of thermal equilibrium;

a device utilizing coherent emission and at least partial quantum-physical collapses of wave functions or quantum-mechanical superposition of states and at least partial collapses of wave functions to generate temperature differences within one body or between several bodies;

a device utilizing coherent emission and at least partial quantum-physical collapses of wave functions or quantum-mechanical superposition of states and at least partial collapses of wave functions to generate differences of other parameters than temperature, such as pressure, momentum, angular momentum, electric properties, magnetic properties, within one body or between several bodies; and a device performing heating, cooling, matter transport, energy transport, or power conversion.

According to an embodiment of the above third aspect, the quantum device of the first aspect could be coupled to a device, which is configured to generate electric power out of a temperature difference, which builds up in the quantum device. Such a device may, for example, comprise a thermocouple, which could be connected, i.e., thermally coupled with the two ports, in particular, the two black body radiators located at the two ports in order to convert their temperature difference into electric power.

The person skilled in the art recognizes additional features and advantages upon reading the following detailed description and upon giving consideration to the accompanying drawings. This person will also understand that further optical components such as apertures, lenses, and mirrors may be added to the devices without impeding its function or changing the gist of the present disclosure.

BRIEF DESCRIPTION OF THE DRAWINGS

The accompanying drawings are included to provide a further understanding of examples and are incorporated in and constitute a part of this specification. The drawings illustrate examples and serve together with the description to explain principles of examples. Other examples and many of the intended advantages of examples will be readily appreciated as they become better understood by reference to the following detailed description.

FIG. 1 also shows a quantum wave that is emitted by the emitter to travel as quantum mechanical superposition of two partial waves simultaneously to the left and to the right of the transmission structure.

FIG. 4 comprises FIGS. 4A to 4C and refers to a device according to the present disclosure that implements electron waves.

DETAILED DESCRIPTION

Figure 1:
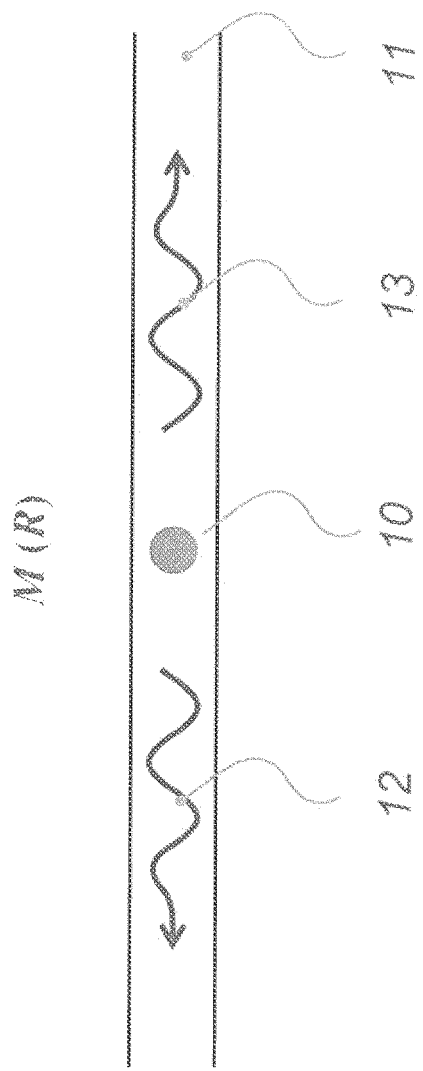
FIG. 1 shows a symbolic representation of an emitter of a quantum wave, which may, for example, be a photon or a phonon, embedded in a one-dimensional transmission structure such as a waveguide or an optical fiber.

In the following description the terms "coupled" and "connected," along with derivatives may be used. It should be understood that these terms may be used to indicate that two elements cooperate or interact with each other, regardless whether they are in direct physical or electrical contact, or they are not in direct or physical or electrical contact with each other, which means that there can be one or more intermediate elements between the two elements.

In the following, the terms "absorber," "emitter" or "absorber/emitter" may be used. It should be understood that these terms are to be understood as any kinds of elements that may absorb or emit any kind of waves, particles and quasi-particles and any kind of radiation. The terms particularly refer to black body radiators (see next paragraph), but also to e.g., resistors, which may absorb or emit electrons.

In this disclosure, the term "black body" and "black body radiators" along with derivatives may be used. It should be understood that the term is used to refer to bodies in a broad sense, to include also solids, liquids, gases, or plasmas that may emit or absorb thermal radiation, but not necessarily being a black body in the textbook sense. Especially, these bodies are not necessarily required to be in thermal equilibrium or to follow Kirchhoff's law. These body may not be 100% black (such bodies do not exist at all), and may or may not be designed as a textbook-like black body radiator consisting of a hollow body with a small opening.

The term "wave" is used to describe any wave associated with a quantum object, be it, for example, the wave of a photon or a de-Broglie wave of a particle or quasiparticle. The considered waves are created/modified in elementary interaction processes, which must be described quantum mechanically and may undergo quantum mechanical collapse under conditions such as detailed, for example, in Ref 7. Besides that the term "wave" also includes wave packets, for example, wave packets with Gaussian envelope functions.

The term "collapse" is used to describe any process causing an at least partially phase-breaking decoherence of quantum-mechanical states.

When describing and claiming a quantum device in the following, it should be noted that the term "quantum device" is to be understood in a broad and extensive manner. Concerning the function of the devices revealed here, such a device basically acts as a device for matter or electromagnetic waves, for example, for photons, particle waves, quasiparticle waves. Concerning its structure it can be understood as an artificial or man-made structure in which, for example, optical transmission paths, electromagnetic waveguides, electrical wires or lines are fabricated by different technological methods, including integrated circuit technology. It can, however, also be understood as consisting of or comprising chemical components like, for example, molecules, molecule compounds, molecule rings like benzene rings with side groups, and so on. It furthermore can refer to solid compounds, e.g., with crystalline structures that exert the device function, or to structures fabricated in or from such crystalline structures.

Furthermore the term "transmission path" can be, but does not have to be understood as a material body. In some devices a material body, e.g., a piece of wire or a waveguide, may comprise one transmission path. In some other devices such a material body may comprise two transmission paths, namely two opposing directions of particles propagating through the material body. In some other devices the term is not to be understood as a tangible or material body, which is fabricated from a specific material. It is rather to be understood as a virtual path of a particle or wave in space, and may even be placed, e.g., in a gaseous atmosphere.

Likewise, the term "atom" may refer to single atoms or molecules, but also to a multitude of atoms, molecules or particles with a characteristic behavior, wherein the behavior of single atoms, without or with the presence of superradiance. The term also comprises defects in solids, for example, color centers that can absorb and emit waves in a manner as atoms do. The atom may also be fixed to a mass m that is much larger than that of a single atom.

Also, the term "random" is used here to not only describe processes of completely random nature. The term is also used to describe, for example, distributions of phases that are so irregular that interference events between waves with such phases are significantly oppressed.

Furthermore, the term "phase coherent" does not necessarily imply that there is no inelastic, phase-breaking scattering taking place in the device. Indeed, as shown in Ref. 9, some inelastic scattering, for example, with phonons, is compatible with phase coherence of the part of the wave not affected by the scattering and may be beneficial or in some cases even be required for device operation. The term "phase coherent" should therefore be understood as including either the absence of inelastic, phase-breaking scattering of the transmission of particles in the device, or to also include the presence of such events, provided that a part of the wave with a phase unaffected by phase-breaking scattering events remains.

In addition, the term "half-transparent" does not necessarily imply that the transmission of a device is 50% exactly. The term is instead intended to also describe objects that are partially transparent, with any transparency between 0% and 100%.

Furthermore any features, remarks, or comments, mentioned in connection with one or more quantum device or a use of one or more quantum devices are to be understood as also disclosing a respective method feature or method step for making the quantum device(s) function or for implementing the quantum device(s) in any kind of greater device or system and driving the quantum device(s) so that such greater device or system will fulfill its desired function.

FIG. 1 shows a representation of an atom 10 in the sense specified above embedded in a one-dimensional transmission structure 11, which is configured so that the atom 10 can send out waves only in two opposite directions. The atom M located at position R sends out a photon that travels simultaneously to the left and to the right of the transmission structure, as sketched in the drawing by the two partial waves 12 and 13. These partial waves may be formed, for example, by planar waves or wave packets that may be Gaussian. Waves 12 and 13 are characterized by phases $\varphi_{12}(r, t)$ and $\varphi_{13}(r, t)$, respectively, where r is the spatial coordinate and t is the time. The difference of the two phases $\Phi = \varphi_{12}(r, t) - \varphi_{13}(r, t)$ is a measurable quantity.

FIG. 2 shows an asymmetric, half-transparent mirror HTM (20). In the case shown in FIG. 2, the half-transparent mirror consists of a transparent plate 20.1, fabricated, for example, from glass, that on the surface facing the right is covered, for example, with a dielectric coating 20.2. The properties of the coating are chosen such that the mirror reflects half of the incoming radiation and let the other half pass as shown in FIGS. 2A-2D. Such mirrors are commonly used in optics, and are described, for example, in Ref. 8 or in Ref. 7. FIG. 2A explains that a wave with a phase $\varphi_0$ impinging on the beamsplitter HTM from port A is divided into two partial waves that have the same phase $\varphi_0$. FIG. 2B shows that a wave with a phase $\varphi_0$ impinging on the beamsplitter from port B is split by the splitter into two partial waves that have a phase difference of $\Phi = \pi$.

Figure 2A:
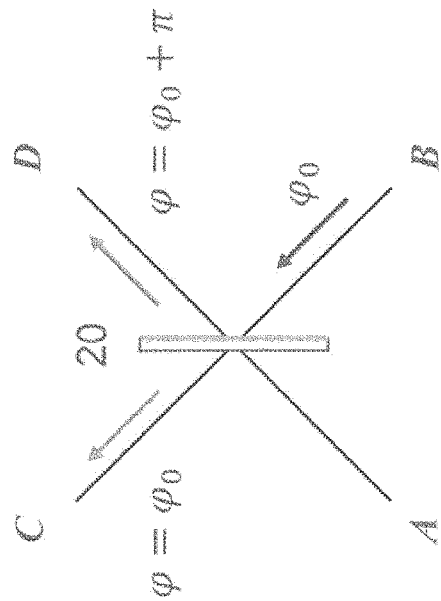
FIG. 2 comprises FIGS. 2A, 2B, 2C and 2D and shows an asymmetric, half-transparent mirror with a dielectric coating on its right surface. The figure illustrates the transmission and reflection of quantum waves that arrive at the mirror from various directions and with various phase shifts.
Figure 2B:
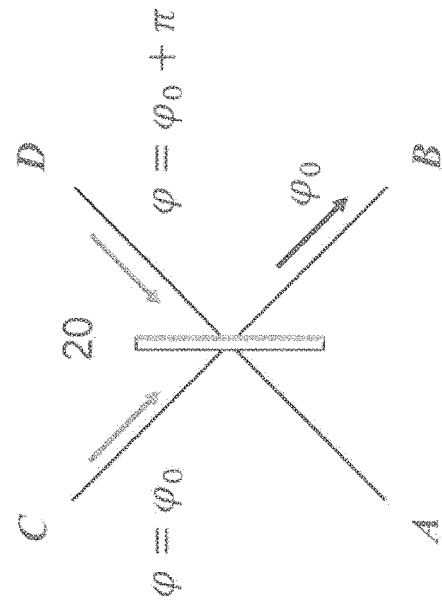
Figure 2C:
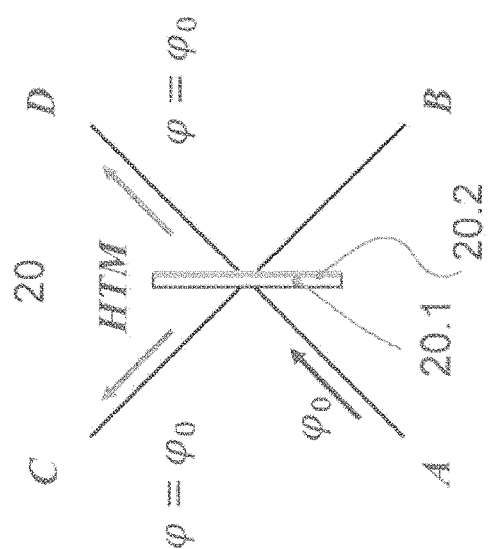
Figure 2D:
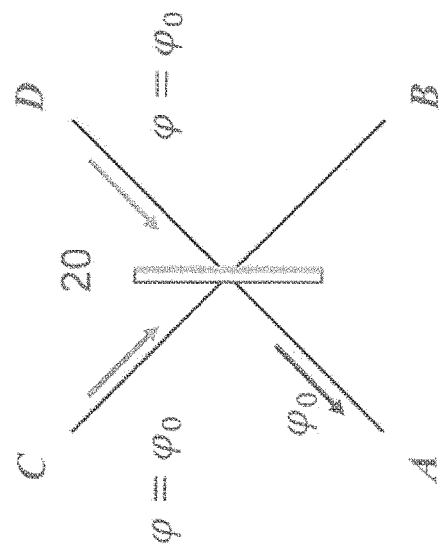

FIGS. 2C and 2D illustrate that two partial waves that arrive at the beamsplitter from ports C and D get combined by the beamsplitter. Depending on whether the phase difference $\Phi$ of the incoming partial waves equals $\Phi = 0$ or $\Phi = \pi$, the combined wave leaves the splitter toward port A or port B, as illustrated by FIGS. C and D, respectively.

For other values of $\Phi$, the waves are distributed with a $\Phi$-dependent transmission probability to port A and to port B, respectively. This probability is given by Eq. 8.

Figure 3:
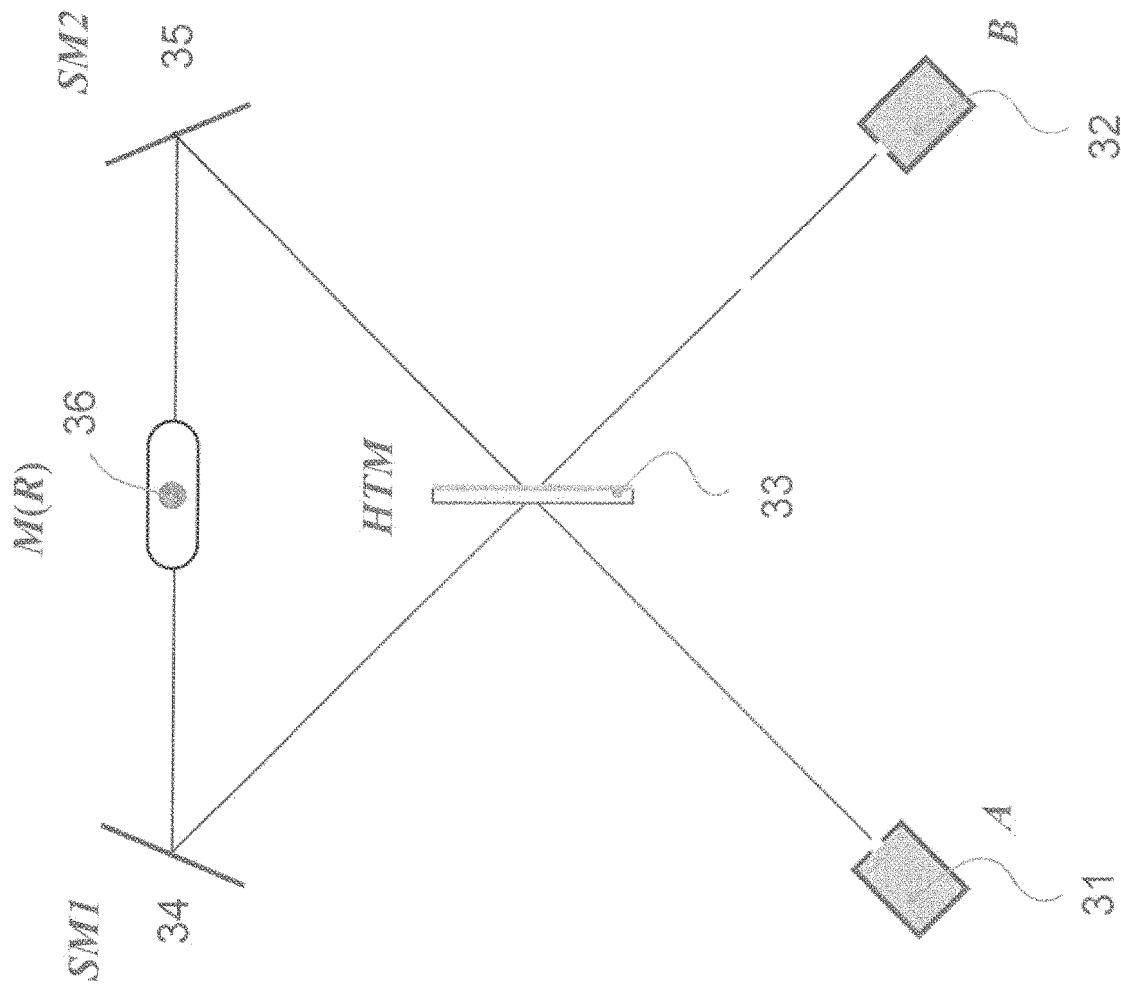
FIG. 3 illustrates an embodiment of a quantum device according to the first aspect of the present disclosure. This devices comprises two ports, A and B provided by two black body radiators, a transmission structure for the quantum waves involving an asymmetric, half-transparent mirror HTM according to FIG. 2, two standard mirrors SM1, SM2, and an arrangement of particles M positioned at location R, serving as emitter as shown in FIG. 1.

FIG. 3 explains the principle of the working device. The figure shows that two identical black body radiators A (31) and B (32) are connected by a transmission structure to the asymmetric half-transparent mirror HTM (33) as described in FIG. 2. The quantum waves that have been reflected by the half-transparent mirror 33, or that have passed through it, are guided by two standard mirrors 34 and 35 onto an atom M located in a one-dimensional transmission channel, as described in FIG. 1. The atoms are placed with an accuracy much better than the wavelength of the radiation at a position R, which is, for example, located at the left/right symmetry plane of the device. The position R is determined such that the lengths of the two beam paths from the HTM (33) to the position R are equal (or differ by $n \times \lambda$, $n = 1$, 2, ...; $\lambda$ being the wavelength) up to an accuracy of much less than the wavelength $\lambda$, of the radiation as, for example, $\frac{1}{10} \lambda$, or less, $\frac{1}{20} \lambda$, or less, $\frac{1}{50} \lambda$, or less. With this, it will be ensured that a first wave that emanates at the HTM (33) and is reflected by the mirror 34 and a second wave that emanates at the HTM (33) and is reflected by the mirror 35 interfere at the position R in a best possible manner.

The device function is now described in the next three paragraphs. The subsequent several paragraphs provide a straightforward overview of the device operation.

A) Overview of Device Operation

First quantum waves emitted by the thermal radiation of the black body radiator A (31) pass through the half-transparent mirror HTM (33) and, as explained in FIG. 2A, converge with a phase difference $\Phi = 0$ onto the atom M(R) (36). Part of the waves become absorbed by M(R). In this process the atom M(R) emits second quantum waves (photons, phonons, etc.) by stimulated and by spontaneous emission. The wave packets that pass M(R) (36) undisturbed, the wave packets created by stimulated emission, and a part of the wave packets that are spontaneously emitted have a phase difference $\Phi = 0$. These waves will reach the black body A after having passed through the half-transparent mirror HTM (33). Some of the second wave packet pairs created by the spontaneous emission of M(R) (36) have, however, a phase difference $\Phi \neq 0$. A part of these waves therefore reaches port B (32). The absorption and reemission of the wave packets by M(R) (36) represents a quantum mechanical collapse process, the superposition of these wave packets by the half-transparent mirror is an act of a quantum mechanical superposition of states.

Quantum waves emitted by the thermal radiation of the black body radiator B (31) pass through the mirror and, as explained in FIG. 2A, converge with a phase difference $\Phi = \pi$ onto the atoms 36. Due to this phase difference $\Phi = \pi$ the quantum waves interfere destructively at the location of the atoms. The waves therefore cannot interact with the atoms and pass through them unaltered. Due to their phase difference remaining $\Phi = \pi$, all of them are guided by the half-transparent mirror 33 to the black body B, where they become absorbed.

Adding up the waves emitted by A and B, i.e., the ports 31 and 32, it becomes obvious that part of the waves emitted by A (31) are channeled to B (32). However, all of the waves emitted by B (32) are reflected back to B (32). No quantum wave emitted by B reaches A. Because A and B emit equal numbers of quantum waves, the devices provides a net transfer of quantum waves from A to B. The motion of the quantum waves between the two ports 31 and 32 is therefore nonreciprocal. Due to different flux of quantum waves travelling into 31 and 32, these receive a different amount of energy, momentum, and also angular momentum if hit non-centrically. Due to these changes, further properties of these bodies, such as their temperature, pressure, electronic properties, optical properties, or magnetic properties may change.

B) Description of Device Operation

The first 1-photon quantum wave states emitted with frequency $\omega_k$ by the black bodies A and B (31 and 32) are transformed by the asymmetric beam splitter HTM (33) into 1-photon states, such that at R they are given by $$|A_R\rangle = 1/\sqrt{2}(|1_k, 0\rangle + |0, 1_{-k}\rangle), |B_R\rangle = 1/\sqrt{2}(|1_k, 0\rangle - |0, 1_{-k}\rangle). \quad \text{(Eq. 1)}$$

Because the polarization of the quantum waves plays no role for the device operation, polarization indices are suppressed.

The action of the beam splitter HTM (33) is described by the unitary 2×2-matrix $$M_{HTM} = \frac{1}{\sqrt{2}} \begin{pmatrix} 1 & 1 \\ -1 & 1 \end{pmatrix}. \quad \text{(Eq. 2)}$$

Let denote $(|B_0\rangle, |A_0\rangle)^T$ the input modes of the beamsplitter, coming from the reservoirs A, B (31, 32). By interference, HTM maps them to the output modes $(|1_k, 0\rangle, |0, 1_{-k}\rangle)^T$ as described by $M_{HTM}$ [Ref. 8, page 212].

The Hamiltonian of the interaction of the quantum wave modes with the two-level systems M(R) reads [Ref. 8, page 168], $$H_I = i\hbar \sum_{k>0, j} g_k \left[ \sigma_j^- \left( a_k^\dagger + a_{-k}^\dagger \right) e^{-i(\omega_0 - \omega_k)t} - h.c. \right]. \quad \text{(Eq. 3)}$$

Here, $\sigma_j^+$ ($\sigma_j^-$) denotes the excitation (destruction) operator of the two level system 36 comprising atoms $j = 1 \ldots M$, and $a_k$ ($a_k^\dagger$) the annihilation (creation) operator of mode k. The excited (ground) state of the atoms is $|e\rangle$ ($|g\rangle$), the energy difference between $|e\rangle$ and $|g\rangle$ equals $\hbar\omega_0$, the frequency of the light modes is $\omega_k$. The shortcut h.c. designs the hermitian conjugate.

The probability for absorption if atom j of M is irradiated by a wave coming from A, respectively, B, is provided by the matrix elements $$p_{j,A}{}^a = |\langle 0,0;e_j|H_I|A_R;g_j\rangle|^2, p_{j,B}{}^a = |\langle 0,0;e_j|H_I|B_R;g_j\rangle|^2. \quad \text{(Eq. 4)}$$

It follows that $p_{A,j}{}^a = 2\hbar^2 g_k{}^2$ and $p_{B,j}{}^a = 0$. An analogous result is obtained in case the initial state equals $|A_R; e_j\rangle$ or $|B_R; e_j\rangle$, corresponding to stimulated emission. The absorption of the quantum waves presents a collapse process.

The radiation from A (first waves) interacts with the atoms M(R), whereas the light from B passes M(R) (36) without disturbance. The state $|B_R\rangle$ arrives again at the beam splitter and is transformed there into the state $|B_0\rangle$ (with reversed momentum), because $M_{HTM}^{-1} = M_{HTM}^T$.

This insight reveals that all radiation emitted by B ends up again in B, not being influenced by the presence of M(R) (36). In contrast, if $\omega_k = \omega_0$, the radiation from A interacts with M(R).

The state $|0,0; e_j\rangle$ decays by spontaneous emission into 1-photon states with frequency $\omega_0$, i.e., into states forming second waves $$|\alpha,\Phi\rangle = \alpha|1_k,0;g_j\rangle + e^{i\Phi}\sqrt{1-\alpha^2}|0,1_{-k};g_j\rangle \quad \text{(Eq. 5)}$$

with $0 \leq \alpha \leq 1$ and $0 \leq \Phi \leq 2\pi$.

The probability for this process is proportional to $$p_j^{se}(\alpha,\Phi) = |\langle \alpha,\Phi|H_I|0,0;e_j\rangle|^2 = \hbar^2 g_k{}^2(1+2\alpha\sqrt{1-\alpha^2}\cos\Phi). \quad \text{(Eq. 6)}$$

These considerations reveal that there is no emission into the mode $|B_R\rangle$ ($\Phi = \pi$). This behavior is consistent with the fact that there is also no absorption of such quantum waves by M(R), corresponding to the detailed balance condition for this unique superposition.

Accordingly, it is found that $$p_j^{se}(1/\sqrt{2},0) = p_{j,A}{}^a. \quad \text{(Eq. 7)}$$

However, although detailed balance is satisfied separately for each coherent superposition, the beam splitter (HTM) 33 distributes the states $|\alpha, \Phi\rangle$ between A and B in the following manner:

$$|\alpha, \Phi\rangle \rightarrow \frac{1}{\sqrt{2}}(\alpha - e^{i\Phi}\sqrt{1-\alpha^2})|\tilde{B}_0\rangle + \frac{1}{\sqrt{2}}(\alpha + e^{i\Phi}\sqrt{1-\alpha^2})|\tilde{A}_0\rangle \quad \text{(Eq. 8)}$$

As a result, the fraction $19/30$ of the quantum waves spontaneously emitted by M(R) reaches the black body A and a fraction of $11/30$ reaches black body B.

These considerations reveal that energy is transferred with preference from A to B, via the two-level system M(R) excited by A.

The corresponding rate equations for the systems are given by:

$$\frac{dn_A}{dt} = [-(M-M_e)B_{12} + M_e B_{21}]\frac{\gamma\hbar\omega_0 n_A}{c} + \frac{19}{30}A_{21}M_e, \quad \text{(Eq. 9)}$$

$$\frac{dn_B}{dt} = \frac{11}{30}A_{21}M_e, \quad \text{(Eq. 10)}$$

$$\frac{dM_e}{dt} = [(M-M_e)B_{12} - M_e B_{21}]\frac{\gamma\hbar\omega_0 n_A}{c} - A_{21}M_e. \quad \text{(Eq. 11)}$$

with the Einstein coefficients $A_{12}$, $B_{12}$, and $B_{21}$. $M_e$ denotes the number of excited atoms of M(R) (36) and c is the speed of light. Both black bodies, 31 and 32, are coupled to the wave guide, emitting a fraction of $\gamma n_{A,B}$ quantum waves with frequency $\omega_0$ per unit time.

One appreciates readily that the only steady state solution of these equations is $n_A(t) = M_e(t) = 0$, which implies that in the final state the reservoir A (31) is completely empty and that all atoms in M(R) occupy their ground states, whereas the complete radiative and excitation energy has flowed to reservoir B (32). Correspondingly, the temperature of A and M(R) (36) is zero, whereas the temperature of reservoir B is larger than zero.

Because the basic principle of the device presented relies on the interference, the collapse, and the collective absorption of quantum waves, devices may be implemented that utilize matter waves rather than electromagnetic waves. With respect to FIG. 4, one possible implementation for an electron device that operates in a manner analog to the device of FIG. 3 is now presented in an exemplary manner. Nonreciprocal devices for matter waves have been introduced in Ref. 1 and Ref. 3. The sources of the electrons, which take the role of 31, 32 in FIG. 3, consist each of a series connection of a resistor and a capacitor. The resistor generates voltage noise and current noise following the Johnson-Nyquist formula (Ref. 14, Ref. 15). To foster the analogy to the conservation of the photon number of the device shown in FIG. 3, the capacitor ensures that the number of electrons in the circuit is constant, a requirement that in some cases may not even be stringent.

Figure 4A:
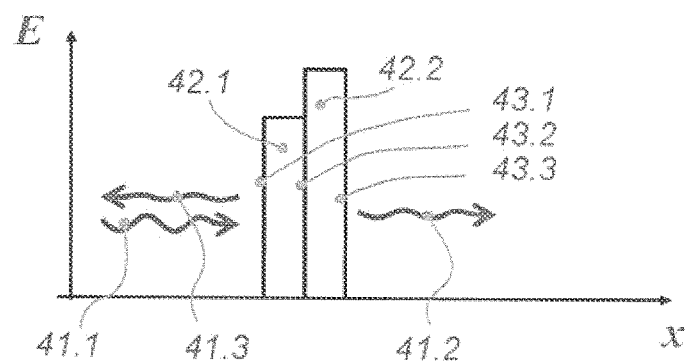
FIG. 4A shows an illustration of a nonreciprocal tunnel junction that serves in this exemplary device as asymmetric beam splitter.

The function of the asymmetric beamsplitter HTM (33) is achieved by an asymmetric tunnel junction as shown in FIG. 4A. The tunnel barriers are chosen such that the transmission for electrons in both directions equals 50%. FIG. 4A shows as example an electron wave 41.1 arriving at the barrier from the left, which is split into two partial waves. The partial wave 41.2 tunnels through the barrier 42, the partial wave 41.3 is reflected by the barrier. The fabrication of the tunnel barrier 42 from two different materials 42.1 and 42.2 (in this example) with non-reciprocal transport properties for matter waves and the resulting properties of the interfaces 43.1, 43.2, and 43.3 ensures that the phase shifts $\Phi$ between the outgoing electron waves 41.2 and 41.3 depends on whether the quantum wave 41.1 impinges on the barrier from the left (as drawn) or from the right, much as is the case for the HTM (33).

Figure 4B:
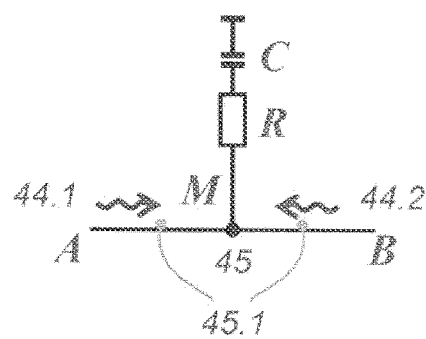
FIG. 4B illustrates the realization of a configuration M that serves as analog of the atom M(R)
Figure 4C:
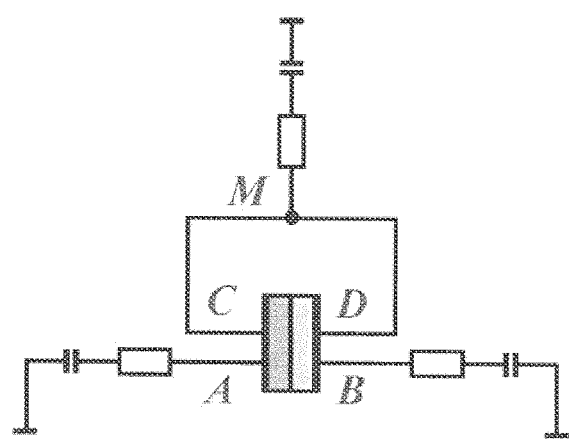
FIG. 4C shows a possible implementation of the complete device.

The function of the atom M(R) is generated by a three-terminal junction 45 as illustrated in FIG. 4B. The interference of the quantum waves 44.1 and 44.2 at the junction 45 is a function of their phase difference $\Phi$. For the case of $\Phi = \pi$, 44.1 and 44.2 interfere destructively at 45 so that they continue their flow uninterrupted. For $\Phi \neq n\pi$, $n = \ldots -1, 1, 3, \ldots$, a part of the waves reaches the resistor R where it collapses. The number of collapse events increases with increasing constructive character of the interference. As controlled by the thermal noise, electrons are also ejected by R to reach the junction 45, which splits them each into two partial waves occupying the continuum states given by the conductor 45.1. Following Fermi's golden rule, the probability for these two partial waves to have a phase difference of $\Phi$ is $1+\cos\Phi$. The device shown in FIG. 4C is therefore an example for an electronic device that operates in analogy to the photonic device shown in FIG. 3.

The solutions of the rate equations (Eqs. 9-11) calculated numerically for the standard parameters (photons numbers in A and B at t=0: $5 \times 10^5$; number of atoms in M(R): 100;

number of excited atoms in M(R) at t=0: 1; γ=10−4; $A_{21}=B_{12}=B_{21}=10^{-3}$) are displayed by FIGS. 5A-5D.

Figure 5A:
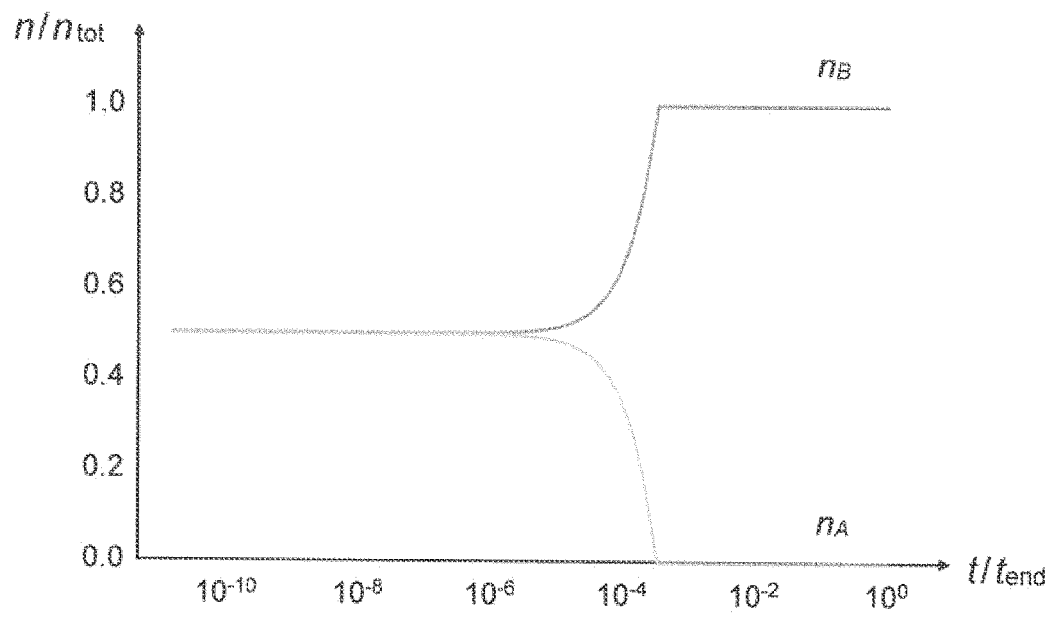
FIG. 5A shows the photon density of the ports A and B, FIG. 5B the number of excited states in the particle arrangement M(R), FIG. 5C the corresponding temperatures of ports A and B, and FIG. 5D the entropy of the complete system.

FIG. 5A shows the numbers of photons $n_A$ and $n_B$ in the black bodies A and B as a function of time. As shown by the figure, the initial state corresponding to the standard thermal equilibrium with an equal number of quantum waves in A and B is not maintained by the system. Rather, all photons of A are moved to B.

Figure 5B:
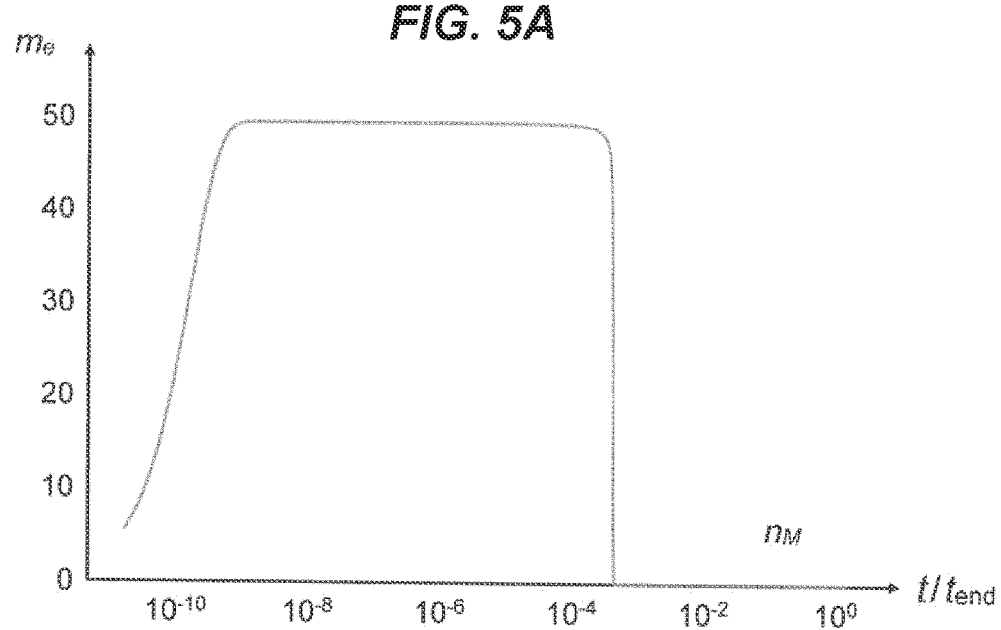
FIG. 5 comprises FIGS. 5A-5D and shows the calculated behavior of a device according to FIG. 3 as a function of time.

FIG. 5B shows the number of excited atoms $n_M$ in M(R) as a function of time. As the figure reveals, this number rises from 1 to the saturation value 50. During this time M(R) moves photons preferably from A to B. With A becoming depleted of photons, the number of excited atoms in M(R) reduces to zero.

Figure 5C:
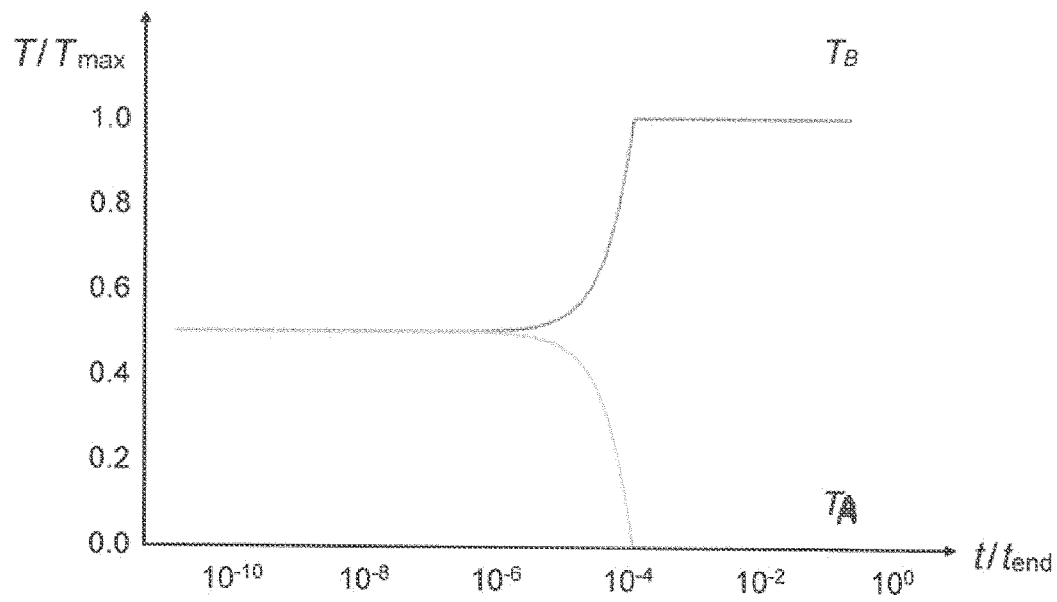

FIG. 5C shows the temperatures $T_A$ and $T_B$ of the photon distributions in the black bodies A and B as a function of time. As shown by the figure, the initial state corresponding to the standard thermal equilibrium with an equal temperature of A and B is not maintained by the system. Rather, A cools to 0 K and B warms up correspondingly.

As mentioned above, A cools down and B warms up so that a temperature difference is generated between A and B. This temperature difference can be utilized to, for example, generate electric power. This can be done, for example, by use of a thermocouple device, in particular, by use of an electrical device comprising two dissimilar electrical conductors forming electrical junctions at differing temperatures. Such a thermocouple device may thus produce a temperature-dependent voltage as a result of the thermoelectric effect.

Figure 5D:
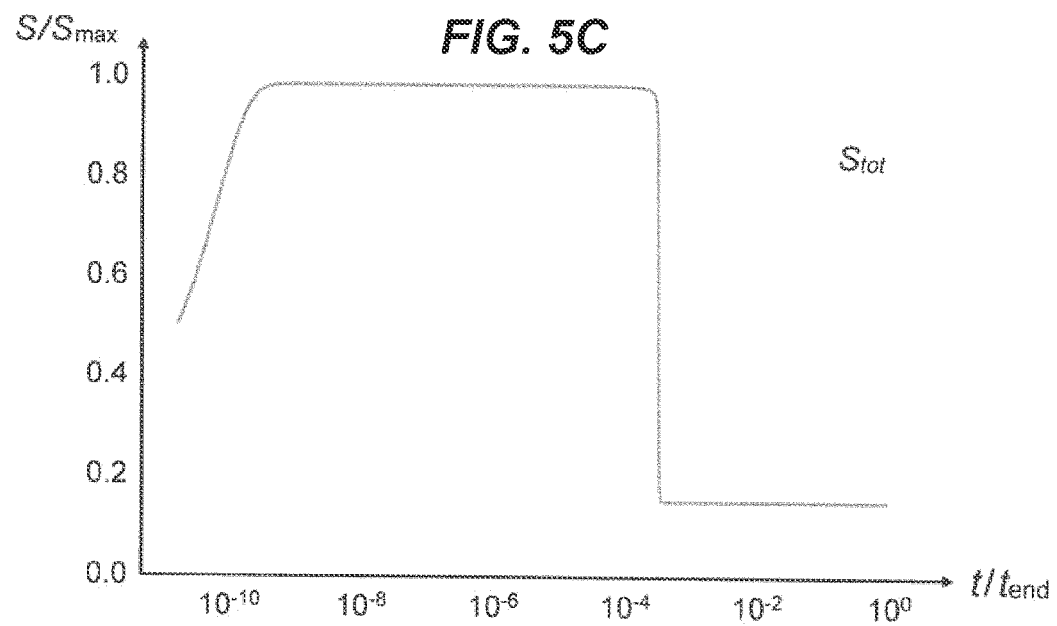

Finally, FIG. 5D shows the entropy of the complete system. The system is thermally isolated from its environment, and the starting condition is a uniform temperature in the whole system. Nevertheless, the entropy decreases as a function of time, showing a clear violation of the second law of thermodynamics.

It should be mentioned at this point that by the gist of the present disclosure, the quantum device can have many other structures than that shown in FIG. 3. The half transparent mirror, the black bodies, or the atom may be implemented in other manners. The black bodies may, for example, be provided by other reservoirs of thermally excited quantum waves, such as bodies that provide thermally excited phonons. The half-transparent mirror may be replaced by other devices that, for example, split quantum waves and recombine them using junctions in transmission paths, or metamaterials that act, for example, on phonons. The atoms M may, for example, also be given by other systems that provide for a collapse and reemission of quantum waves, such as a noisy reservoir emitting particles into a conductor with an adjacent fork-type junction or split. It seems also realistic that complete devices may be implemented, for example, in molecules or crystalline solids or solids with complex structures.

It should furthermore be mentioned that also the geometry of the transmission path shown in FIG. 3 presents one simple embodiment only. The paths may be more complex, and comprise, for example, several loops, also using the third dimension of space. Also other components such as additional scatterers, nonreciprocal filters, or further black bodies may be included.

According to a second aspect of the present disclosure a method for operating a quantum device according to the first aspect comprises supplying the first waves to the quantum device, wherein the first waves comprise quanta with energies obtained from a thermal source or with energies E of order kT, such that 0<E<100 kT, wherein T is the temperature of the environment.

A method for operating a quantum device according to the first aspect could alternatively or in addition be defined as comprising a source of the first waves, wherein at least one source of the first waves is held in thermal contact with an environment. The environment can be a natural environment like a room being at room temperature, or a place in free nature. It can also be an artificial environment such as the cavity containing the device, or such as a thermal bath provided, for example, by a water bath or a hot oven.

A method for operating a quantum device according to the first aspect could alternatively or in addition be defined as comprising providing a source of the first waves, wherein the source of the first waves is not actively stimulated, in particular, not actively stimulated by non-thermal energy so that it would be possible that the source is actively heated or cooled.

It is noted that the behavior of the devices does not agree with the zeroth, the second, and the third law of thermodynamics, according to the manner these laws are today commonly understood and presented in the textbooks such as Ref. 11. The zeroth law is violated because the two bodies 31 and 32 brought into thermal contact via the device do not establish an equal temperature, but rather develop a temperature difference. The uniform temperature distribution, i.e., the state of maximal entropy is unstable such that the system moves into a state of lower energy, which conflicts the second law. The device also conflicts the third law, because body 31 may achieve a temperature of 0 K, which has been understood to be impossible for a body due to the third law. Note that the device does not conflict the statement of the third law that the entropy of a system that is not degenerate equals zero at 0 K. By some experts like e.g., the famous physicist Enrico Fermi a disagreement with the second law was anticipated, see, for example, Ref. 16. In Ref. 10 a hypothetical system is discussed, which has been claimed to show some disagreement between quantum physics and the second law of thermodynamics. As noted by these authors, however, the disagreement is confined to quantum-mechanically entangled states present only at very low temperatures as these states are destroyed by decoherence processes. Furthermore, the entanglement has to be of multi-particle type. These requirements render the proposed system unrealistic for a practical implementation. In contrast, the present disclosure does not rely on entanglement but on single-particle coherence, collapse processes and interference.

Indeed, for many decades it has been dreamed about which advantages a then still hypothetical device would entail that would violate the second law of thermodynamics Ref 6.

Nevertheless, as known by the expert and by the layman, see e.g., Ref. 5, Ref 13, Ref. 6 or Ref. 11, a practical device that breaks the second law of thermodynamics, commonly known as a perpetuum mobile of the second kind, has only been speculated about. Current discussions are focused on devices that use quantum effects occurring at temperatures close to absolute zero, in particular, quantum entanglement, as summarized in Ref. 12. Due to a lack of ideas about how a practical device could work, these studies have never made the transition from speculations to functioning devices. Indeed, most members of the scientific community are convinced that such a device may, by matter of principle, never be built.

It should further be mentioned that the above-described quantum devices and their applications may require some coupling to heat baths. In a simple case, the heat baths may be given by the black bodies 31 and 32. The medium of such a heat bath can be solid, liquid or gaseous. The devices may extract energy from one or of several of the heat baths and transfer the heat energy, e.g., to one or several other heat baths.

It is also apparent that the above described devices can be connected together in any useful manner. They can perhaps be implemented to operate in parallel to enhance their output. Likewise devices may be operated in series. For example, to the black body B1 of a first device that is cooled by this device, a second device may be thermally connected, such that the black body B2 of the second device becomes heated to even higher temperatures than the body B1.

It is a further valuable aspect of the present disclosure that easy control can be established over the processes driven by the quantum collapse. The processes can be controlled, for example, by blocking a part of the transmission paths or by moving or turning one or more of the optical components. The systems may therefore be equipped with one or more input terminal for process control.

The present disclosure also relates to the following further aspects. These aspects refer to devices in which a quantum device according to the first aspect can be implemented so that the respective device fulfills a particular function as will be outlined in the following.

The present disclosure also relates to a device utilizing coherent emission and at least partial collapses of wave functions to achieve a deviation from one or more of the zeroth law, the second, or the third law of thermodynamics.

The present disclosure also relates to a device utilizing quantum-mechanical superposition of states and at least partial collapses of wave functions to achieve a deviation from one or more of the zeroth, the second, or the third law of thermodynamics.

The device according to any one of the above aspects may operate at a temperature in the range of 0 K-5000 K.

The device according to any one of the above aspects may or may not be coupled to or entangled with a bath in the quantum regime.

The present disclosure also relates to a device utilizing coherent emission and at least partial quantum-mechanical collapses of wave functions or quantum-mechanical superposition of states and at least partial collapses of wave functions to generate or to enhance inhomogeneities in the density of the energy distribution of waves or particles in a system. The energy distribution may be an energy distribution generated at least partially by thermal energy.

The present disclosure also relates to a device utilizing coherent emission and at least partial quantum-physical collapses of wave functions or quantum-mechanical superposition of states and at least partial collapses of wave functions to shift a system out of the state of thermal equilibrium.

The present disclosure also relates to a device utilizing coherent emission and at least partial quantum-physical collapses of wave functions or quantum-mechanical superposition of states and at least partial collapses of wave functions to generate temperature differences within one body or between several bodies.

In a device according to any one of the above aspects phase shifts may be induced by at least one non-reciprocal component of the device.

In a device according to any one of the above aspects the at least partial quantum physical collapse of the wave function is achieved by the use of a possibly macroscopic body, which may, for example, be a solid, a liquid, a gas, or a plasma.

In a device according to any one of the above aspects the at least partial quantum physical collapse and an at least partial absorption of the wave function at a body is followed by a statistical reemission of a wave by said body.

In a device according to any one of the above aspects an at least partially quantum physical collapsed wave is statistically replaced by another wave with a random phase, or the phase of a wave is changed to a random value.

In a device according to any one of the above aspects the device creates useful work by converting a generated radiation density inhomogeneity or a generated temperature difference into electricity, radiation, optical energy, or other forms of energy, or by using the achieved order in some other manner.

In a device according to any one of the above aspects the device transports mass, particles, energy, heat, momentum, angular momentum, charge, or magnetic moments within one body or between several bodies.

In a device according to any one of the above aspects the device charges a storage system for energy, waves or matter, for example, a capacitor or a battery.

In a device according to any one of the above aspects wherein the device heats or cools bodies.

In a device according to any one of the above aspects in which device one or several of the bodies of the device are operated at another base temperature than room temperature, for example, by using an additionally provided heating or cooling function.

In a device according to any one of the above aspects in which device one or more internally or externally created signals are used to control the process.

The key elements contributing to the apparent violation of the second law are the generation of particle states split into multiple wave packets, the quantum mechanical collapse of at least some of the multiple wave-packet states, and the sorting of single and multiple wave-packet states by interference, where the latter step transfers the coherence properties of the wave packets into a useful output signal. These robust, single-particle processes are scalable, they function in a wide temperature range including high-temperatures, are compatible with a standard room-type environment, and can be implemented in a large variety of devices acting on many species of quantum waves, including electromagnetic, particle and quasiparticles waves.

It is noted that in the literature descriptions of photonic devices can be found that bear a deceptive, superficial resemblance to the devices disclosed here. None of these devices use the principle mechanism described in the current disclosure, and therefore also cannot achieve a violation of the second law. As an illustrative example, the device presented by Söllner et al. in FIG. 3 of their publication (I. Söllner et al.: "Deterministic photo-emitter coupling in chiral photonic circuits," NATURE TECHNOLOGY, vol. 10, no. 9, 1 Sep. 2015, pages 775-778) is mentioned. There, a quantum dot is presented that in their device plays an active role, such as the atom M (36) plays an active role in the device disclosed. These roles are fundamentally different, however, and accordingly the device functions much differ. The quantum dot of Söllner et al. merely introduces a directional dependent phase-shift, without a statistical process, a collapse, absorption, or emission. The state of the quantum dot does not change as a function of time, and the whole device is therefore operating in a deterministic manner, as the title of that publication already reveals. That four-terminal device is described by a unitary scattering matrix, as, for example, is also the case for the device presented by Ballestro et al. The device disclosed here, however, is able to function on two ports only, and nonreciprocity is achieved by breaking the unitarity with statistical collapse processes.

While the present disclosure has been illustrated and described with respect to one or more implementations, alterations and/or modifications may be made to the illustrated examples without departing from the spirit and scope of the appended claims. In particular, with regard to the various functions performed by the above described components or structures (assemblies, devices, circuits, systems, etc.), the terms (including a reference to a "means") used to describe such components are intended to correspond, unless otherwise indicated, to any component or structure that performs the specified function of the described component (e.g., that is functionally equivalent), even though not structurally equivalent to the disclosed structure, which performs the function in the herein illustrated exemplary implementations of the present disclosure.

The invention claimed is:

1. A quantum device, comprising:
a transmission structure connected between at least a first port and a second port, wherein
the transmission structure is designed to implement collapse, interference and selective absorption of quantum waves to achieve a nonreciprocal motion of the quantum waves between the first port and the second port,
wherein at least part of phases of the quantum waves travelling between the at least first port and the at least second port are erased and replaced by random phases, using the action of non-phase conserving scattering events.

2. The quantum device according to claim 1, further comprising:
at least one first port and at least one second port; and
the transmission structure comprising at least two first transmission paths extending between the at least one first port and the at least one second port,
wherein first waves originating from the at least one first port and the at least one second port are split up into first partial waves propagating on both of the at least two first transmission paths, and the first partial waves interfere at least in part such that a resulting superposition depends on whether the first partial waves originated from the at least one first port or the at least one second port.

3. The quantum device according to claim 1, further comprising:
at least one first port and at least one second port; and
the transmission structure comprising at least two first transmission paths extending between the first port and the second port,
wherein first waves are split up into first partial waves propagating on both of the at least two first transmission paths, and
second waves at least partially originating from the transmission structure are split up by the transmission structure into second partial waves propagating on both of the at least two first transmission paths and the second partial waves interfere at least in part such that the second partial waves reach one of the first port and the second port.

4. The quantum device according to claim 1, wherein an action of the transmission structure is altered by moving or turning parts, by changing transmission properties of transmission paths, or by changing their properties by mechanical, electrical, magnetic, or optical means.

5. A system, comprising:
one or more quantum devices comprising:
a transmission structure connected between at least a first port and a second port, wherein the transmission structure is designed to implement collapse, interference and selective absorption of quantum waves to achieve a nonreciprocal motion of quantum waves between the at least the first port and the second port; and
a device using the one or more quantum devices, wherein the one or more quantum devices utilize at least partial quantum-physical collapses of wave, wherein the at least partial quantum-physical collapses and an at least partial absorption of a wave function at a body is followed by a statistical reemission of a wave by the body.

6. The system of claim 5, wherein:
the one or more quantum devices comprise at least one first port and at least one second port;
the transmission structure comprises at least two first transmission paths extending between the at least one first port and the at least one second port; and
first waves originating from the at least one first port and the at least one second port are split up into first partial waves propagating on both of the at least two first transmission paths, and the first partial waves interfere at least in part such that a resulting superposition depends on whether the first partial waves originated from the first port or the second port,
wherein the first waves comprise quanta with energies obtained from a thermal source or with energies E of order kT, such that $0<E<100kT$, where T is a temperature of an environment and k is Boltzmann's constant.

7. The system of claim 5, wherein the one or more quantum devices utilizes coherent emission and at least partial collapses of wave functions to achieve a deviation from one or more of the zeroth, the second, or the third law of thermodynamics.

8. The system of claim 5, wherein the one or more quantum devices utilizes quantum-mechanical superposition of states and at least partial collapses of wave functions to achieve a deviation from one or more of the zeroth, the second, or the third law of thermodynamics.

9. The system of claim 5, wherein the one or more quantum devices utilizes coherent emission and at least partial quantum-physical collapses of wave functions or quantum-mechanical superposition of states and at least partial collapses of wave functions to generate or to enhance inhomogeneities in a density of an energy distribution of waves or particles in the system.

10. The system of claim 5, wherein the one or more quantum devices utilizes coherent emission and at least partial quantum-physical collapses of wave functions or quantum-mechanical superposition of states and at least partial collapses of wave functions to shift the system out of a state of thermal equilibrium.

11. The system of claim 5, wherein the one or more quantum devices utilizes coherent emission and at least partial quantum-physical collapses of wave functions or quantum-mechanical superposition of states and at least partial collapses of wave functions to generate temperature differences within one body or between several bodies.

12. The system of claim 5, wherein the one or more quantum devices comprises an interferometer.

13. The system of claim 5, wherein the one or more quantum devices performs heating, cooling, matter transport, energy transport, or power generation.

14. The system of claim 5, wherein the one or more quantum devices operate at a temperature in a range of 0 K-5000 K.

15. The system of claim 5, wherein at least parts of the one or more quantum devices are subject to non-thermal energy input, in particular non-thermal irradiation by electromagnetic waves, electrons, neutral particles, or ions.

16. The system of claim 5, wherein the one or more quantum devices is free from coupling to and entanglement with a bath in a quantum regime.

17. The system of claim 5, wherein the one or more quantum devices utilizes coherent emission and at least partial quantum-physical collapses of wave functions or quantum-mechanical superposition of states and at least partial collapses of wave functions to generate or to enhance in-homogeneities in a density of an energy distribution, a momentum distribution, or an angular momentum distribution of waves or particles in the system.

18. The system of claim 17, wherein the energy distribution, the momentum distribution, or the angular momentum distribution is generated at least partially by thermal energy.

19. The system of claim 5, wherein:
the one or more quantum devices utilizes at least partial quantum-physical collapses of wave functions; and
the at least partial quantum-physical collapses of the wave functions is achieved by use of a macroscopic body, the macroscopic body including at least one of a solid, a liquid, a gas, and a plasma.

20. The system of claim 5, wherein the one or more quantum devices creates useful work by converting a generated radiation density inhomogeneity or a generated temperature difference into electricity, radiation, optical energy, or other forms of energy, or by using an achieved order in some other manner.

21. The system of claim 5, wherein the one or more quantum devices transports mass, particles, energy, heat, momentum, angular momentum, charge, or magnetic moments within one body or between several bodies.

22. The system of claim 5, wherein the one or more quantum devices charges a storage system for energy, waves or matter.

23. The system of claim 5, wherein the one or more quantum devices heats or cools bodies, waves, or ensembles of waves.

24. The system of claim 5, wherein at least one internally or externally created signal is used to control operation of the device.

25. A quantum device, comprising:
a transmission structure connected between at least a first port and a second port, wherein the transmission structure is designed to implement collapse, interference and selective absorption of quantum waves to achieve a nonreciprocal motion of the quantum waves between the first port and the second port,
wherein the quantum device extracts heat energy from a surrounding heat bath and converts the heat energy into the nonreciprocal motion of the quantum waves between the first port and the second port, wherein generation of the nonreciprocal motion of the quantum waves is stimulated, free of non-thermal energy, by the heat bath, and thereby the quantum device converts the heat energy into the nonreciprocal motion.

26. A system, comprising:
one or more quantum devices comprising:
a transmission structure connected between at least a first port and a second port, wherein the transmission structure is designed to implement collapse, interference and selective absorption of quantum waves to achieve a nonreciprocal motion of the quantum waves between the first port and the second port; and
a device using the one or more quantum devices, wherein the one or more quantum devices utilize at least partial quantum-physical collapses of wave functions and an at least partially collapsed quantum physical wave is statistically replaced by another wave with a random phase.

* * * * *